(12) United States Patent
Rapo-Brunet (10) Patent No.: US 9,060,566 B2
(45) Date of Patent: Jun. 23, 2015

(54) SHOE SOLE COMPRISING A RUBBER COMPOSITION BASED ON NITRILE-BUTADIENE RUBBER, AN OIL AND A RESIN

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Sofia Rapo-Brunet, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 0 days.

(21) Appl. No.: 14/367,552

(22) PCT Filed: Dec. 14, 2012

(86) PCT No.: PCT/EP2012/075604
§ 371 (c)(1),
(2) Date: Jun. 20, 2014

(87) PCT Pub. No.: WO2013/092429
PCT Pub. Date: Jun. 27, 2013

(65) Prior Publication Data
US 2014/0336311 A1  Nov. 13, 2014

(30) Foreign Application Priority Data
Dec. 23, 2011 (FR) ..................... 11 62355

(51) Int. Cl.
*A43B 13/04* (2006.01)
*A43B 13/02* (2006.01)
*C08K 5/548* (2006.01)
*C08K 3/00* (2006.01)
*C08L 9/02* (2006.01)

(52) U.S. Cl.
CPC ............... *A43B 13/04* (2013.01); *A43B 13/026* (2013.01); *C08K 5/548* (2013.01); *C08K 3/0033* (2013.01); *C08L 9/02* (2013.01)

(58) Field of Classification Search
USPC ................... 523/167; 524/306, 492, 495, 526
See application file for complete search history.

(56) References Cited

U.S. PATENT DOCUMENTS

| | | |
|---|---|---|
| 5,681,649 A | 10/1997 | Mashita et al. |
| 5,755,045 A | 5/1998 | Mashita et al. |
| 2002/0054970 A1 | 5/2002 | Umezawa |

OTHER PUBLICATIONS

PCT/EP2012/075604, International Search Report (ISR), Form PCT/ISA/210, dated Feb. 18, 2013 (including English translation), 5 pgs.

*Primary Examiner* — Edward Cain
(74) *Attorney, Agent, or Firm* — Dickinson Wright PLLC (57) ABSTRACT

Shoe soles comprising a rubber composition comprising at least:
  60 to 100 phr of a nitrile-butadiene rubber;
  between 10 and 50 phr of a reinforcing filler;
  a plasticizing system comprising:
    a hydrocarbon-based resin having a Tg of greater than 20° C.;
    a plasticizer that is liquid at 20° C., the Tg of which is less than −20° C.;
  a crosslinking system, such that the elastomer composition based on a nitrile-butadiene rubber and a mixture of two plasticizers, one liquid plasticizer and one resin, makes it possible to obtain shoe soles having a good grip on various floors, while retaining a good wear resistance and a low hydrocarbon absorption.

16 Claims, 2 Drawing Sheets

SHOE SOLE COMPRISING A RUBBER COMPOSITION BASED ON NITRILE-BUTADIENE RUBBER, AN OIL AND A RESIN

This application is a 371 national phase entry of PCT/EP2012/075604, filed 14 Dec. 2012, which claims benefit of FR 1162355, filed 23 Dec. 2011, the entire contents of which are incorporated herein for all purposes.

BACKGROUND

1. Field

The disclosure relates to shoe soles and to the rubber compositions which can be used for the manufacture of such soles. The disclosure relates to shoes, in particular work shoes, safety shoes or sports shoes, for example which require good grip qualities on floors naturally made slippery by liquid or solid foreign materials, for instance natural or synthetic very smooth coatings, such as synthetic floorings in particular made of linoleum (registered trademark) material, varnished tiles, polished stone, metal surfaces, especially when these surfaces are moist or wet with a liquid (water, oil, fat, blood, soap, etc), or even covered with mud or ice.

2. Description of Related Art

A shoe sole must, in a known manner, satisfy a large number of often antinomic technical requirements, among which are grip on various floor qualities, wear resistance, notch resistance, and low absorption of synthetic and natural hydrocarbons.

These compromises in terms of properties can be obtained in particular through the use of novel compositions based on nitrile rubbers. Nitrile rubbers have the ability to weakly absorb hydrocarbons. In addition to their excellent resistance to oil products, they have an agreeable behaviour with respect to aliphatic solvents and also animal or vegetable oils and fats.

However, they are particularly stiff. In order to decrease their stiffness, it is possible to reduce the filler content or to increase the plasticizer content.

However, in accordance with their low oil-absorbing capacity, the content of plasticizer which can be introduced is limited.

SUMMARY

Continuing their research, the applicants have discovered a rubber composition comprising a nitrile-butadiene rubber combined with a combination of specific plasticizers, used as a shoe sole, which makes it possible to overcome the abovementioned drawback and thus to guarantee good grip on various floors, while retaining good wear resistance.

Thus, a first subject of the invention relates to a shoe sole comprising a rubber composition comprising at least 60 to 100 phr of a nitrile-butadiene rubber, between 10 and 50 phr of a reinforcing filler, a plasticizing system comprising a hydrocarbon-based resin having a Tg of to greater than 20° C., a plasticizer that is liquid at 20° C., the Tg of which is less than −20° C., and a crosslinking system.

Figure 1:
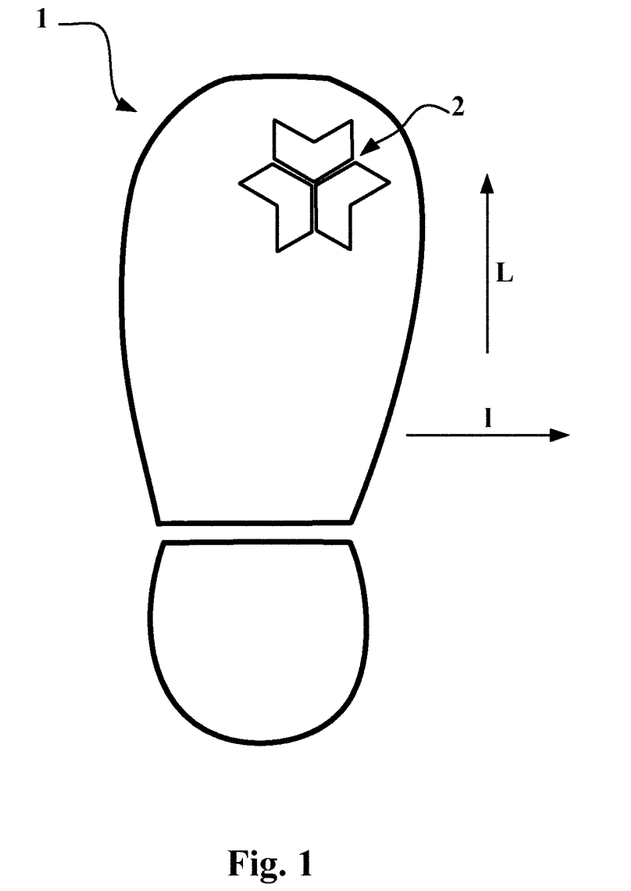
FIG. 1 is a schematic diagram of an embodiment of a shoe sole as disclosed herein.
Figure 2:
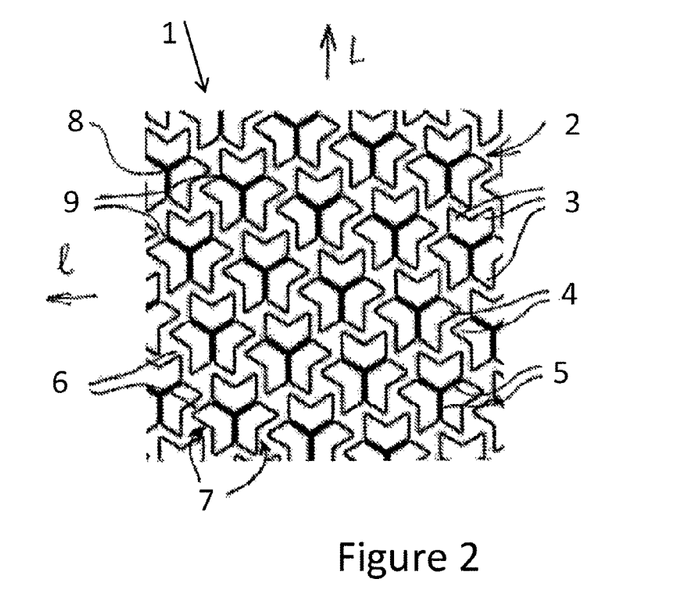
FIG. 2 is a schematic diagram of an embodiment of a pattern of a shoe sole as disclosed herein.
Figure 3:
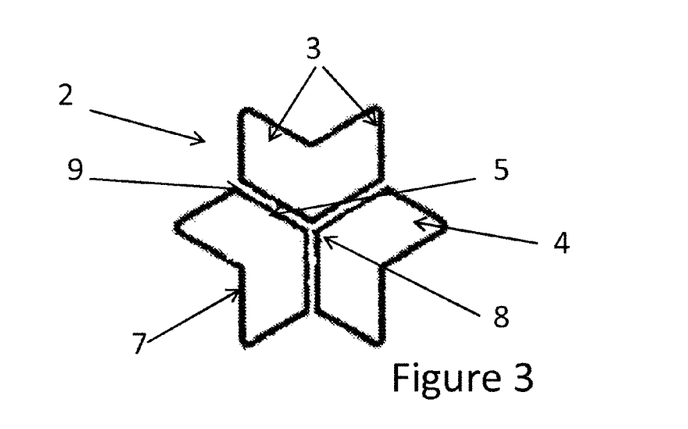
FIG. 3 is a schematic diagram of an embodiment of a pattern of a shoe sole as disclosed herein.

The embodiments of the invention and also its advantages will be easily understood in the light of the description and exemplary embodiments which follow, and also FIGS. 1 to 3 relating to these examples, which diagrammatically represent, in 3 views from above, an example of a shoe sole in accordance with the invention.

I—MEASUREMENTS AND TESTS USED

The rubber compositions used in the shoe soles according to the invention and also the soles themselves are characterized, after curing, as indicated below.

I.1 Tensile Tests

The preparation of the test specimens and also the procedure used for performing the measurement are in accordance with Standard ISO 37. The dumbbell-shaped test specimens used are of type 2.

These tests make it possible to determine the elasticity stresses and the properties at break. The elongations at break (EB in %) and the breaking stresses (BS in MPa) are measured. All these tensile measurements are carried out under the standard conditions of temperature (23±2° C.) and hygrometry (50±5% relative humidity), according to French Standard ISO 37.

I.2—Shore A Hardness

The Shore A hardness of the compositions after curing is assessed in accordance with Standard ISO 48.

I.3—Wear Test

The wear test is carried out according to the SATRA TM 174 method: 1994, of the Satra Technology Centre laboratory. It consists in measuring the loss of volume, expressed in $mm^3$, of a sample of elastomer composition smeared onto an abrasive surface.

I.4—Hydrocarbon Absorption Measurement

The amount of hydrocarbon absorbed by a sample of rubber composition is measured according to the SATRA TM 63 method: 2009, of the Satra Technology Centre laboratory. The amount of oil absorbed by samples after 24 h of immersion in a hydrocarbon-based solvent, 2,2,4-trimethylpentane, at 23° C., is measured.

I.5—Friction Coefficient Measurement

Friction coefficient measurement tests are carried out on shoe soles, according to the SATRA TM 144 method: 2007, of the Satra Technology Centre laboratory.

For friction coefficient values of between 0.3 and 1.25, the pedestrian can move entirely safely. Below 0.3, the risks of the pedestrian slipping are too high, above 1.25, the grip is too great and the pedestrian may develop joint problems.

BRIEF DESCRIPTION OF DRAWINGS

The embodiments of the invention and advantages thereof will be easily understood in the light of the attached drawings, which diagrammatically represent, in 3 views from above, an example of a shoe sole in accordance with the invention. More specifically.

II. DETAILED DESCRIPTION OF SPECIFIC EMBODIMENTS

In the present application, in a known manner:
- the term "diene elastomer" (or, without distinction, "diene rubber") is intended to mean an elastomer resulting at least in part (i.e. a homopolymer or a copolymer) from diene monomer(s) (i.e. monomer(s) bearing two conjugated or non-conjugated carbon-carbon double bonds).
- the term "phr" means parts by weight per hundred parts of elastomer (of the total of the elastomers, if several elastomers are present).

Furthermore, in the present description and unless otherwise expressly indicated, all the percentages (%) indicated are % by weight; likewise, any interval of values denoted by the expression "between a and b" represents the range of values greater than "a" and less than "b" (i.e. limits a and b excluded), whereas any interval of values denoted by the expression "from a to b" means the range of values extending from "a" up to "b" (i.e. including the strict limits a and b).

The shoe sole according to embodiments of the invention therefore has the essential characteristic of comprising a rubber composition comprising 60 to 100 phr of a nitrile-butadiene rubber, between 10 and 50 phr of a reinforcing filler, a plasticizing system comprising a hydrocarbon-based resin having a Tg of greater than 20° C., a plasticizer that is liquid at 20° C., the Tg of which is less than −20° C., and a crosslinking system.

II.1—Nitrile-Butadiene Rubber

The rubber composition of the shoe sole according to embodiments of the invention comprises from 60 to 100 phr of nitrile-butadiene rubber.

Nitrile-butadiene rubber is by definition a copolymer based on at least one butadiene monomer and one nitrile monomer, i.e. a monomer bearing a nitrile function.

Nitrile-butadiene rubbers are known for their hydrocarbon-resistance properties. This resistance increases according to the increase in the ratio of nitrile monomer to butadiene monomers. Preferentially, the nitrile rubber comprises between 25% and 45% by weight of nitrile monomer.

The nitrile monomers are, for example, acrylonitrile, methacrylonitrile, ethylacrylonitrile, crotononitrile, 2-pentenonitrile or mixtures of these compounds, among which acrylonitrile is preferred.

For a butadiene content of between 55% and 75% by weight, the nitrile-butadiene rubber proved to have an optimum grip with the surrounding rubber compositions, in the case of a shoe sole comprising several elastomer layers; below 55% by weight, the grip is considered to be insufficient.

The butadiene monomers which are suitable are in particular 1,3-butadiene, 2,3-dimethyl-1,3-butadiene, 2-methyl-1,3-butadiene, 2-ethyl-1,3-butadiene, 2-phenyl-1,3-butadiene, or mixtures of these dienes. Among these conjugated dienes, use is preferably made of 1,3-butadiene or 2-methyl-1,3-butadiene, more preferentially 1,3-butadiene.

According to another preferential embodiment, nitrile-butadiene rubber has a glass transition temperature (Tg, measured according to ASTM D3418) included in the range from 0° C. to −60° C., more preferentially in the range from −5° C. to −50° C. The Tg can in particular be adjusted within these temperature ranges by virtue of the amounts of butadiene present in the polymer.

According to one preferential embodiment of the invention, the nitrile rubber is an NBR rubber. The NBR thus has a nitrile monomer content of between 10% and 60%, preferentially between 20% and 50% and in particular between 25% and 45% by weight. NBRs are commercially available, in particular sold by the company Lanxess under the name Perbunam 3445F, said product comprising approximately 34% by weight of acrylonitrile.

According to another particular embodiment, the rubber composition of the shoe sole according to the invention also comprises at least one second diene elastomer, other than the nitrile-butadiene rubber, this optional elastomer being present according to the content of from 0 to 40 phr and preferably at a content of between 0 and 20 phr.

The second diene elastomer is preferably selected from the group consisting of polybutadienes (BRs), synthetic polyisoprenes (IRs), natural rubber (NR), butadiene copolymers, isoprene copolymers and blends of these elastomers. Such copolymers are more preferentially selected from the group consisting of butadiene/styrene copolymers (SBRs), isoprene/butadiene copolymers (BIRs), isoprene/styrene copolymers (SIRs) and isoprene/butadiene/styrene copolymers (SBIRs) and blends of these elastomers.

More preferentially, the second diene elastomer is selected from the group consisting of natural rubber, polybutadienes and blends of these elastomers.

These second diene elastomers can, for example, be block, random, sequential or microsequential elastomers and can be prepared in dispersion or in solution; they can be coupled and/or star-branched or else functionalized with a coupling and/or star-branching or functionalization agent.

The following are in particular suitable: polybutadienes having a content (mol %) of 1,2-units of between 4% and 80% or those having a content (mol %) of cis-1,4-units of greater than 80%, polyisoprenes, butadiene/styrene copolymers and in particular those having a Tg (glass transition temperature, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75%, a content (mol %) of trans-1,4-bonds of between 10% and 80%, butadiene/isoprene copolymers and in particular those having an isoprene content of between 5% and 90% by weight and a Tg of −40° C. to −80° C., or isoprene/styrene copolymers and in particular those having a styrene content of between 5% and 50% by weight and a Tg of between −25° C. and −50° C.

According to another particular embodiment, the second diene elastomer is an isoprene elastomer. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, even more preferentially of greater than 98%.

II.2—Reinforcing Filler

The shoe sole comprises, as another essential characteristic, between 10 and 50 phr of a reinforcing filler (carbon black and/or reinforcing inorganic filler such as silica), preferentially between 10 and 40 phr. Below 10 phr, the cohesion of the shoe sole is judged to be insufficient, and above 50 phr, there is a risk of the sole becoming excessively stiff.

Use may be made of any type of reinforcing filler known for its abilities to reinforce a rubber composition which can be used for the manufacture of rubber objects, in particular soles or tyres, for example an organic filler, such as carbon black, a reinforcing inorganic filler, such as silica, or also a blend of these two types of filler, in particular a blend of carbon black and silica.

All carbon blacks, in particular "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, according to the intended applications, the blacks of higher series (for example N660, N683, N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

The term "reinforcing inorganic filler" should be understood, in the present application, by definition, as meaning any inorganic or mineral filler (whatever its colour and its natural or synthetic origin), also known as "white" filler, "clear" filler or even "non-black filler", in contrast to carbon black, capable of reinforcing by itself alone, without means other than an intermediate coupling agent, a rubber composition intended for the manufacture of rubber objects, in other words capable of replacing, in its reinforcing role, a conventional tyre-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, reinforcing inorganic filler is also intended to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to those skilled in the art, in particular any to precipitated or fumed silica exhibiting a BET specific surface area and a CTAB specific surface area both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in Application WO 03/16837.

The reinforcing inorganic filler used, in particular if it is silica, preferably has a BET specific surface area of between 45 and 400 $m^2/g$, more preferably of between 60 and 300 $m^2/g$.

Use is made, in a known way, in order to couple the reinforcing inorganic filler to the diene elastomer, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650).

Suitable in particular, without the definition below being limiting, are silane polysulphides referred to as "symmetrical", corresponding to the following general formula (I):

Z-A-S$_x$-A-Z, in which: (I)

x is an integer from 2 to 8 (preferably from 2 to 5);
A is a divalent hydrocarbon-based radical (preferably $C_1$-$C_{18}$ alkylene groups or $C_6$-$C_{12}$ arylene groups, more particularly $C_1$-$C_{10}$, in particular $C_1$-$C_4$, alkylenes, in particular propylene);

Z corresponds to one of the formulae below:

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl)tetrasulphide, abbreviated to TESPT, of formula [($C_2H_5O)_3Si(CH_2)_3S_2]_2$, or bis(triethoxysilylpropyl) disulphide, abbreviated to TESPD, of formula [($C_2H_5O)_3Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in Patent Application WO 02/083782 (or US 2004/132880).

Mention will in particular be made, as coupling agent other than an alkoxysilane polysulphide, of bifunctional POSs (polyorganosiloxanes) or else of hydroxysilane polysulphides ($R^2$=OH in the above formula VIII), such as described, for example, in Patent Applications WO 02/30939 (or U.S. Pat. No. 6,774,255) and WO 02/31041 (or US 2004/051210), or else of silanes or POSs carrying azodicarbonyl functional groups, such as described, for example, in Patent Applications WO 2006/125532, WO 2006/125533 and WO 2006/125534.

In the rubber compositions in accordance with embodiments of the invention, the content of coupling agent is preferably between 4 and 12 phr, more preferably between 4 and 8 phr.

Those skilled in the art will understand that, as filler equivalent to the reinforcing inorganic filler described in the present section, a reinforcing filler of another nature, in particular organic nature, could be used provided that this reinforcing filler is covered with an inorganic layer, such as silica, or else comprises functional sites, in particular hydroxyl sites, at its surface that require the use of a coupling agent in order to form the bond between the filler and the elastomer.

II.3—Plasticizers

The composition of the shoe sole according to embodiments of the invention has the other essential characteristic of comprising a plasticizing system comprising:
- a hydrocarbon-based resin having a Tg of greater than 20° C.;
- a plasticizer that is liquid at 20° C., the Tg of which is less than −20° C.

Preferentially, the plasticizing system comprises a content A of between 4 and 30 phr of a hydrocarbon-based resin having a Tg of greater than 20° C.

Preferentially, the plasticizing system also comprises a content B of between 4 and 30 phr of a plasticizer that is liquid at 20° C., the Tg of which is less than 20° C.

Even more preferentially, the sum of the contents A and B is between 8 and 40 phr.

The liquid plasticizer is liquid at 20° C.; it is described as a "low Tg" plasticizer, that is to say that it has a Tg of less than −20° C., preferably less than −40° C.

Any extending oil, any liquid plasticizer known for its plasticizing properties with regard to diene elastomers, can be used. At ambient temperature (20° C.), these plasticizers or these oils, which are more or less viscous, are liquids (that is to say, as a reminder, substances which have the ability to eventually assume the shape of their container), in contrast in particular to plasticizing hydrocarbon-based resins, which are by nature solids at ambient temperature.

Liquid plasticizers selected from the group consisting of liquid diene polymers, polyolefin oils, paraffinic oils, DAE (Distillate Aromatic Extracts) oils, MES (Medium Extracted Solvates) oils, TDAE (Treated Distillate Aromatic Extracts) oils, RAE (Residual Aromatic Extracts) oils, TRAE (Treated Residual Aromatic Extracts) oils, SRAE (Safety Residual Aromatic Extracts) oils, mineral oils, vegetable oils, ether plasticizers, ester plasticizers, phosphate plasticizers, sulphonate plasticizers and mixtures of these compounds are particularly suitable. According to one more preferential embodiment, the liquid plasticizer is selected from the group consisting of MES oils, TDAE oils, vegetable oils and mixtures of these oils. Even more preferentially, the liquid plasticizer is a vegetable oil.

According to a preferred embodiment of the invention, the liquid plasticizer, in particular petroleum oil, is of the non-aromatic type. A liquid plasticizer is described as non-aromatic when it exhibits a content of polycyclic aromatic compounds, determined with the extract in DMSO according to the IP 346 method, of less than 3% by weight, with respect to the total weight of the plasticizer. In this respect, use may preferentially be made of a liquid plasticizing agent selected from the group consisting of MES oils, TDAE oils, paraffinic oils and mixtures of these oils. RAE oils, TRAE oils and SRAE oils or mixtures of these oils, which contain low contents of polycyclic compounds, are also suitable as petroleum oil.

According to another specific embodiment, the liquid plasticizer is a terpene derivative; mention may in particular be made, as example, of the product Dimarone from Yasuhara.

The liquid polymers resulting from the polymerization of olefins or dienes, such as, for example, those selected from the group consisting of polybutenes, polydienes, in particular polybutadienes, polyisoprenes, copolymers of butadiene and isoprene, copolymers of butadiene or isoprene and styrene, and mixtures of these liquid polymers, are also suitable.

The number-average molar mass of such liquid polymers is preferentially within a range extending from 500 g/mol to 50 000 g/mol, more preferentially from 1000 g/mol to 10 000 g/mol. Mention may in particular be made, by way of example, of the Ricon products from Sartomer.

According to another preferred embodiment of the invention, the liquid plasticizer is a vegetable oil. Use is preferably made of an oil selected from the group consisting of linseed, safflower, soybean, maize, cottonseed, rapeseed, castor, tung, pine, sunflower, palm, olive, coconut, peanut and grapeseed oils, and mixtures of these oils, in particular a sunflower oil. This vegetable oil, in particular sunflower oil, is more preferably an oil rich in oleic acid, that is to say that the fatty acid (or all of the fatty acids, if several are present) from which it derives comprises oleic acid according to a fraction by weight at least equal to 60%, more preferably at least equal to 70%, in particular equal to or greater than 80%.

According to another specific embodiment of the invention, the liquid plasticizer is an ether; mention may be made, for example, of polyethylene glycols or polypropylene glycols.

The liquid plasticizers selected from the group consisting of ester plasticizers, phosphate plasticizers, sulphonate plasticizers and mixtures of these compounds are also suitable. The triesters selected from the group consisting of triesters of carboxylic acid, of phosphoric acid or of sulphonic acid and mixtures of these triesters are suitable in particular. Mention may in particular be made, as examples of carboxylic acid ester plasticizers, of the compounds selected from the group consisting of trimellitates, pyromellitates, phthalates, 1,2-cyclohexanedicarboxylates, adipates, azelates, sebacates, glycerol triesters and mixtures of these compounds. Mention may in particular be made, among triesters, of glycerol triesters, preferably predominantly composed (for more than 50% by weight, more preferably for more than 80% by weight) of an unsaturated $C_{18}$ fatty acid, that is to say selected from the group consisting of oleic acid, linoleic acid, linolenic acid and mixtures of these acids; more preferably, whether it is of synthetic or natural origin, the fatty acid used is composed, for more than 60% by weight, more preferably still for more than 70% by weight, of oleic acid; such triesters (trioleates) having a high content of oleic acid, of natural or synthetic origin, are well known; they have been described, for example, in Application WO 02/088238, as plasticizing agents in treads for tyres. Mention may be made, as phosphate plasticizers, for example, of those which comprise between 12 and 30 carbon atoms, for example trioctyl phosphate.

The plasticizing hydrocarbon-based resin exhibits a Tg of greater than 20° C.

The designation "resin" is reserved in the present patent application, by definition, for a compound that is solid at ambient temperature (20° C.), in contrast in particular to the liquid plasticizing agent previously described.

Hydrocarbon-based resins are polymers well known to those skilled in the art, essentially based on carbon and hydrogen but being able to comprise other types of atoms, which can be used in particular as plasticizing agents or tackifying agents in polymer matrices. They are by nature miscible (i.e., compatible) at the contents used with the polymer compositions for which they are intended, so as to act as true diluents. They have been described, for example, in the work entitled "*Hydrocarbon Resins*" by R. Mildenberg, M. Zander and G. Collin (New York, VCH, 1997, ISBN 3-527-28617-9), Chapter 5 of which is devoted to their applications, in particular in the tyre rubber field (5.5. "*Rubber Tires and Mechanical Goods*"). They can be aliphatic, cycloaliphatic, aromatic, hydrogenated aromatic, of the aliphatic/aromatic type, that is to say based on aliphatic and/or aromatic monomers. They can be natural or synthetic, based or not based on petroleum (if such is the case, also known under the name of petroleum resins). Their Tg is preferably greater than 30° C., in particular between 30° C. and 95° C.

In a known way, these hydrocarbon-based resins can also be described as thermoplastic resins in the sense that they soften when heated and can thus be moulded. They can also be defined by a softening point or temperature. The softening point of a hydrocarbon-based resin is generally greater by approximately 50 to 60° C. than its Tg value. The softening point is measured according to Standard ISO 4625 (ring and ball method). The macrostructure (Mw, Mn and PI) is determined by size exclusion chromatography (SEC) as indicated below.

As a reminder, the SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, tetrahydrofuran, at a concentration of 1 g/liter. The solution is then filtered through a filter with a porosity of 0.45 μm, before injection into the apparatus. The apparatus used is, for example, a "Waters Alliance" chromatographic line according to the following conditions: elution solvent: tetrahydrofuran; temperature 35° C.; concentration 1 g/liter; flow rate: 1 ml/min; volume injected: 100 μl; Moore calibration with polystyrene standards; set of 3 "Waters" columns in series ("Styragel HR4E", "Styragel HR1" and "Styragel HR 0.5"); detection by differential refractometer (for example, "Waters 2410") which can be equipped with operating software (for example, "Waters Millenium").

A Moore calibration is carried out with a series of commercial polystyrene standards having a low PI (less than 1.2), with known molar masses, covering the range of masses to be analysed. The weight-average molar mass (Mw), the number-average molar mass (Mn) and the polydispersity index (PI=Mw/Mn) are deduced from the data recorded (curve of distribution by mass of the molar masses). All the values for molar masses shown in the present patent application are thus relative to calibration curves produced with polystyrene standards.

According to a preferred embodiment of the invention, the hydrocarbon-based resin exhibits at least any one, more preferably all, of the following characteristics:
- a Tg of greater than 20° C. (in particular between 30° C. and 100° C.), more preferentially of greater than 30° C. (in particular between 30° C. and 95° C.);
- a softening point of greater than 50° C. (in particular between 50° C. and 150° C.);
- a number-average molar mass (Mn) of between 400 and 2000 g/mol, preferentially between 500 and 1500 g/mol;
- a polydispersity index (PI) of less than 3, preferentially of less than 2 (as a reminder: PI=Mw/Mn with Mw the weight-average molar mass).

Mention may be made, as examples of such hydrocarbon-based resins, of those selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, α-methylstyrene homopolymer or copolymer resins and mixtures of these resins. Mention may more particularly be made, among the above copolymer resins, of those selected from the group consisting of (D)CPD/vinylaromatic copolymer resins, (D)CPD/terpene copolymer resins, terpene/phenol copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins and mixtures of these resins.

The term "terpene" combines here, in a known way, α-pinene, beta-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Suitable as vinylaromatic monomer are, for example: styrene, α-methylstyrene, ortho-methylstyrene, meta-methylstyrene, para-methylstyrene, vinyltoluene, para(tert-butyl)styrene, methoxystyrenes, chlorostyrenes, hydroxystyrenes, vinylmesitylene, divinylbenzene, vinylnaphthalene or any vinylaromatic monomer resulting from a $C_9$ fraction (or more generally from a $C_8$ to $C_{10}$ fraction).

More particularly, mention may be made of the resins selected from the group consisting of (D)CPD homopolymer resins, (D)CPD/styrene copolymer resins, polylimonene resins, limonene/styrene copolymer resins, limonene/D(CPD) copolymer resins, $C_5$ fraction/styrene copolymer resins, $C_5$ fraction/$C_9$ fraction copolymer resins and mixtures of these resins.

All the above resins are well known to those skilled in the art and are commercially available, for example sold by the company DRT under the name Dercolyte as regards polylimonene resins, by the company Neville Chemical Company under the name Super Nevtac, by Kolon under the name Hikorez or by the company Exxon Mobil under the name Escorez as regards $C_5$ fraction/styrene resins or $C_5$ fraction/$C_9$ fraction resins, or else by the company Struktol under the name 40 MS or 40 NS (mixtures of aromatic and/or aliphatic resins), or else by the company Slantsy Russie, resold by the company Spa Comaredo under the name Resin ROM 10R.

II.4—Various Additives

The elastomer composition of the shoe sole can also comprise all or some of the usual additives customarily used in rubber compositions for tyres, such as, for example, protective agents, such as chemical antiozonants, antioxidants, tackifying resins, reinforcing resins, methylene acceptors or donors, a crosslinking system based either on sulphur or on sulphur donors and/or on peroxide and/or on bismaleimides, vulcanization accelerators or vulcanization activators.

The shoe sole compositions may also contain coupling activators when a coupling agent is used, agents for covering the inorganic filler when an inorganic filler is used, or more generally processing aids capable, in a known manner, owing to an improvement of the dispersion of the filler in the rubber matrix and to a lowering of the viscosity of the compositions, of improving their processability in the uncured state; these agents are, for example, hydrolysable silanes or hydroxysilanes such as alkylalkoxysilanes, polyols, polyethers, amines or hydroxylated or hydrolysable polyorganosiloxanes.

II.5—Preparation of the Compositions

The compositions used in the shoe soles according to embodiments of the invention can be manufactured in appropriate mixers, using two successive phases of preparation well known to those skilled in the art: a first phase of thermo-mechanical working or kneading ("non-productive" phase) at high temperature, up to a maximum temperature of between 110° C. and 190° C., preferably between 130° C. and 180° C., followed by a second phase of mechanical working ("productive" phase) down to a lower temperature, typically of less than 110° C., for example between 40° C. and 100° C., during which finishing phase the crosslinking system is incorporated.

The process for preparing such compositions comprises, for example, the following steps:

incorporating in a mixer, into at least 80 to 100 phr of nitrile-butadiene rubber, during a first step ("non-productive" step), between 10 and 50 phr of the reinforcing filler, a plasticizing resin and a liquid plasticizer, by thermomechanically kneading the whole mixture (for example one or more times), until a maximum temperature of between 110° C. and 190° C. is reached;

cooling the whole mixture to a temperature of less than 100° C.;

subsequently incorporating, during a second step ("productive" step), a crosslinking system;

kneading the whole mixture up to a maximum temperature of less than 110° C.

By way of example, the non-productive phase is carried out in a single thermomechanical step during which, firstly, all the required base constituents (nitrile-butadiene rubber, reinforcing filler) are introduced into an appropriate mixer, such as a standard internal mixer, followed, secondly, for example after kneading for one to two minutes, by the other additives, including plasticizers, optional additional agents for covering the filler or optional additional processing aids, with the exception of the crosslinking system. The total duration of the kneading, in this non-productive phase, is preferably between 1 and 15 min.

After cooling the mixture thus obtained, the crosslinking system is then incorporated in an external mixer, such as an open mill, maintained at a low temperature (for example between 40° C. and 100° C.). The combined mixture is then mixed (productive phase) for a few minutes, for example between 2 and 15 min.

The crosslinking system per se is preferably based on sulphur and on a primary vulcanization accelerator, in particular on an accelerator of the sulphenamide type. Various known secondary vulcanization accelerators or vulcanization activators, such as zinc oxide, stearic acid, guanidine derivatives (in particular diphenylguanidine), and the like, come to be added to this vulcanization system, being incorporated during the first non-productive phase and/or during the productive phase. The sulphur content is preferably between 0.5 and 3.0 phr and the content of the primary accelerator is preferably between 0.5 and 5.0 phr.

Use may be made, as (primary or secondary) accelerator, of any compound capable of acting as accelerator of the vulcanization of diene elastomers in the presence of sulphur, in particular accelerators of the thiazole type and their derivatives and accelerators of the thiuram and zinc dithiocarbamate types. These accelerators are more preferably selected from the group consisting of 2-mercaptobenzothiazole disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-(tert-butyl)-2-benzothiazolesulphenamide (abbreviated to "TBBS"), N-(tert-butyl)-2-benzothiazolesulphenimide (abbreviated to "TBSI"), zinc dibenzyldithiocarbamate (abbreviated to "ZBEC") and mixtures of these compounds. Preferably, use is made of a primary accelerator of the sulphenamide type.

The resulting final composition can then be calendered, for example in the form of a sheet, from which the shapes of the sole will be cut out, or of a plaque in particular for laboratory characterization.

The invention, in an embodiment, relates to the shoe soles described above, both in the uncured state (that is to say, before curing) and in the cured state (that is to say, after crosslinking or vulcanization).

II.6—Shoe Sole According to Embodiments of the Invention

The rubber composition described above is therefore used in any type of shoe sole, in particular in a work shoe sole having a sculpture of "Star Tread" type, which is described in Patent Application WO 2010/040755. This shoe sole can in particular be used as a safety or sports shoe.

FIG. 1 illustrates a preferential example of production of a shoe sole 1 of "Star Tread" type viewed from above, and also a possible positioning of a block 2 in this shoe sole, very diagrammatically (in particular not to a specific scale).

In FIGS. 2 and 3, the diagrammatically represented shoe sole comprises a base of elastomer material, at least one zone of which is fitted with contact blocks 2 which emerge from its lower face so as to come into contact with the ground.

In FIG. 2, if the same conventions of orientation of the pattern relative to the longitudinal direction L and the transverse direction 1 of the soul are maintained, it is noted that all the blocks 2 in the form of a six-pointed star each have two stems 3 oriented mainly in the longitudinal direction, both ways, and a stem 4 which is oriented in the transverse direction, also both ways.

With reference to FIG. 3, it is seen that a block 2 of the sculpture of FIG. 2, comprising six stems such as 3 and 4, is divided up into three elementary slabs 7 by three slits 5 which extend radially towards the outside from the centre 8 of the block 2. Each of these slits 5 opens into a groove 6 separating the block 2 from its neighbours in a recess 9 located at the junction of two adjacent stems 3 and 4 on the outline of the block 2. Each elementary slab 7 itself comprises two adjacent stems 3 or 4 arranged in the form of a chevron.

III—EXEMPLARY EMBODIMENTS OF THE INVENTION

III.1—Preparation of the Compositions

The following tests are carried out in the following way: the nitrile-butadiene rubber, the reinforcing filler, the plasticizers and also the various other ingredients, with the exception of the vulcanization system, are successively introduced into an internal mixer (final degree of filling: approximately 80% to 95% by volume), the initial vessel temperature of which is approximately 80° C. Thermomechanical working (non-productive phase) is then carried out in one step, which lasts in total approximately from 3 to 4 min, until a maximum "dropping" temperature of 155° C. is reached. The mixture thus obtained is recovered and cooled and then sulphur and an accelerator of sulphenamide type are incorporated on a mixer (homofinisher) at 30° C., everything being mixed (productive phase) for an appropriate time (for example between 5 and 12 min).

The compositions thus obtained are subsequently calendered, either in the form of plaques (thickness from 2 to 3 mm) or of thin sheets of rubber, for the measurement of their physical or mechanical properties, or extruded in the form of a shoe sole.

III.2—Rubber Tests

The tests which followed demonstrate the excellent mechanical, grip, hydrocarbon-absorption resistance and wear-resistance properties of a shoe sole according to the invention, in contact on various surfaces.

For the needs of these tests, five rubber compositions for shoe soles were prepared as indicated above, three in accordance with embodiments of the invention (hereinafter denoted C.3 to C.5) and two not in accordance with the invention (control compositions, hereinafter denoted C.1 and C.2). Their formulations (expressed in phr) are presented in the appended Table 1.

All the rubber compositions are based on 100 phr of NBR and 20 phr of silica.

Composition C.1 is a conventional control composition, which comprises, as plasticizer, 10 phr of liquid paraffin. 10 phr is the maximum amount of liquid paraffin that can be incorporated into an NBR elastomer, without it being possible to observe an exudation phenomenon. Composition C.2 is another control composition, which comprises 10 phr of a different plasticizing agent which is an oleic sunflower vegetable oil.

Compositions C.3 to C.5 are elastomer compositions according to the invention which comprise a mixture of two plasticizers: a liquid plasticizer (10 phr of a sunflower oil containing 85% by weight of oleic acid) and a plasticizing hydrocarbon-based resin ($C_5/C_9$ resin), respectively at 5, 15 and 30 phr. In these compositions, the total amount of plasticizer is greater than 10 phr, however no exudation phenomenon is observed.

Their properties after curing (vulcanization) have been summarized in the appended Table 2.

It is first of all noted that compositions C.3 to C.5 exhibit, after curing, break properties (elongation at break EB and breaking stress BS) greater than those of the control compositions C.1 and C.2, which is an indicator, acknowledged by those skilled in the art, of an improvement in their mechanical properties.

The measurements of the Shore A hardness of compositions C.3 to C.5 according to the invention exhibit values lower than that of the control compositions C.1 and C.2, by virtue of the use of a combination of two types of plasticizers, a liquid plasticizer and a hydrocarbon-based resin. Such values attest to the fact that said combination of plasticizers was indeed incorporated into the mixtures, while producing no phenomenon of exudation of the plasticizers of the shoe sole towards the outside.

Moreover, the results of the volume loss measurements show that compositions C.3 and C.4 have a value of less than 150, which is representative of the acceptable limiting value for shoe sole wear, defined by the Satra Technology Centre laboratory. These compositions having volume loss measurements of less than 150 all have a Shore A hardness of greater than 50.

Composition C.5 has a volume loss value which is much greater than 150 mm$^3$, attesting to excessive wear. This composition does not meet the criteria required for the production of shoe soles.

Hydrocarbon absorption measurements were carried out on compositions C.1 to C.5. These compositions have an absorption coefficient of 2, which is representative of a low hydrocarbon absorption since this value is much lower than the value 12 recommended by the Satran Technology Centre laboratory as being the acceptable limit III.3—Tests on Shoe Soles This test makes it possible to measure the coefficient of friction between shoe soles according to embodiments of the invention comprising a sculpture of "Star Tread" type and produced with elastomer compositions C.1 to C.5, in contact with various surfaces. The tests were carried out on shoe soles having sculpture blocks with a height of 3 mm and comprising notches 2.1 mm deep.

It is noted that, whatever the type of surface, the coefficients of friction are all at least equal to 0.3 (see Table 3), or higher, which indicates good grip of the shoe soles on these various surfaces.

In summary, the results of these tests demonstrate that the use of an elastomer composition based on a nitrile-butadiene rubber and a mixture of two plasticizers, one liquid plasticizer and one resin, at specific contents, in a shoe sole according to the invention, makes it possible to obtain shoe soles having a good grip on various floors, while retaining a good wear resistance and a low hydrocarbon absorption.

TABLE 1

| | Composition No. | | | | |
|---|---|---|---|---|---|
| | C.1 | C.2 | C.3 | C.4 | C.5 |
| NBR (1) | 100 | 100 | 100 | 100 | 100 |
| Filler (2) | 20 | 20 | 20 | 20 | 20 |
| Coupling agent (3) | 1.5 | 1.5 | 1.5 | 1.5 | 1.5 |
| Liquid paraffin | 10 | — | — | — | — |
| Sunflower oil (4) | — | 10 | 10 | 10 | 10 |
| Resin (5) | — | — | 5 | 15 | 30 |
| DPG (6) | 1 | 1 | 1 | 1 | 1 |
| Antioxidant (7) | 2 | 2 | 2 | 2 | 2 |
| Antiozone wax | 1 | 1 | 1 | 1 | 1 |
| Stearic acid (8) | 1.5 | 1.5 | 1.5 | 1.5 | 1.5 |
| ZnO (9) | 1.5 | 1.5 | 1.5 | 1.5 | 1.5 |
| CBS (10) | 2.5 | 2.5 | 2.5 | 2.5 | 2.5 |
| Sulphur | 2.5 | 2.5 | 2.5 | 2.5 | 2.5 |
| ZBEC (11) | 0.5 | 0.5 | 0.5 | 0.5 | 0.5 |

(1) NBR (Perbunan 3445F from the company Lanxess);
(2) Silica (Ultrasil VN3 GR from the company Evonik);
(3) TESTP coupling agent (Si69 from the company Degussa);
(4) Oleic sunflower oil (Lubrirob Tod 1880 from the company Novance);
(5) High Tg $C_5/C_9$ resin (ROM 10R from the company Spa Comaredo);
(6) DPG = diphenylguanidine (Perkacit DPG from the company Flexsys);
(7) Isobutyl methylstyrene phenol (Wingtay S from the company Eliokem);
(8) Stearine (Pristerene from the company Uniquema);
(9) Zinc oxide (industrial grade - from the company Umicore);
(10) N-dicyclohexyl-2-benzothiazolesulphenamide (Santocure CBS from the company Flexsys);
(11) Zinc dibenzyldithiocarbamate (Perkacit ZBEC from the company Performance Additives).

TABLE 2

| | Composition No. | | | | |
|---|---|---|---|---|---|
| | C.1 | C.2 | C.3 | C.4 | C.5 |
| Shore A | 60 | 58 | 56 | 50 | 45 |
| EB (%) | 420 | 460 | 500 | 670 | 770 |
| BS (MPa) | 8 | 8 | 8 | 13 | 10 |
| Volume loss (mm$^3$) | 85 | 83 | 93 | 149 | 400 |
| Hydrocarbon absorption (%) | 1.3 | 1.3 | 1.7 | 2 | 2.5 |

TABLE 3

| | Composition No. | | | |
|---|---|---|---|---|
| | C.2 | C.3 | C.4 | C.5 |
| Dry tiling | 0.78 | 0.83 | 0.74 | 0.67 |
| Wet tiling | 0.69 | 0.71 | 0.71 | 0.64 |
| Tiling with glycerol | 0.58 | 0.59 | 0.53 | 0.48 |
| Tiling with vegetable oil | 0.45 | 0.53 | 0.5 | 0.44 |
| Steel with glycerol | 0.30 | 0.33 | 0.3 | 0.3 |
| Ceramic with soap | 0.37 | 0.37 | 0.5 | 0.37 |
| Ceramic with vegetable oil | 0.32 | 0.37 | 0.34 | 0.31 |
| Synthetic floor with soap | 0.53 | 0.51 | 0.6 | 0.42 |

The invention claimed is:

1. A shoe sole comprising a rubber composition comprising at least:
   60 to 100 phr of a nitrile-butadiene rubber;
   between 10 and 50 phr of a reinforcing filler;
   a plasticizing system comprising:
      a hydrocarbon-based resin having a Tg of greater than 20° C.;

a plasticizer that is liquid at 20° C., the Tg of which is less than −20° C.;
a crosslinking system.

2. The shoe sole according to claim 1, wherein the nitrile-butadiene rubber is a butadiene/acrylonitrile copolymer (NBR).

3. The shoe sole according to claim 1, wherein the plasticizing system comprises a content A of between 4 and 30 phr of the hydrocarbon-based resin having a Tg of greater than 20° C.

4. The shoe sole according to claim 1, wherein the plasticizing system comprises a content B of between 4 and 30 phr of the plasticizer that is liquid at 20° C., the Tg of which is less than −20° C.

5. The shoe sole according to claim 4, wherein the content A+B is between 8 and 40 phr.

6. The shoe sole according to claim 1, wherein the hydrocarbon-based resin is selected from the group consisting of cyclopentadiene homopolymer or copolymer resins, dicyclopentadiene homopolymer or copolymer resins, terpene homopolymer or copolymer resins, $C_5$ fraction homopolymer or copolymer resins, $C_9$ fraction homopolymer or copolymer resins, α-methylstyrene homopolymer or copolymer resins and mixtures of these resins.

7. The shoe sole according to claim 1, wherein the liquid plasticizer is selected from the group consisting of liquid diene polymers, polyolefin oils, paraffinic oils, DAE oils, MES oils, TDAE oils, RAE oils, TRAE oils, SRAE oils, mineral oils, vegetable oils, ether plasticizers, ester plasticizers, phosphate plasticizers, sulphonate plasticizers and mixtures of these compounds.

8. The shoe sole according to claim 7, wherein the liquid plasticizer is selected from the group consisting of MES oils, TDAE oils, vegetable oils and mixtures of these oils.

9. The shoe sole according to claim 8, wherein the liquid plasticizer is a vegetable oil.

10. The shoe sole according to claim 9, wherein the liquid plasticizer is a sunflower oil.

11. The shoe sole according to claim 1, wherein the rubber composition further comprises a second diene elastomer other than the nitrile-butadiene rubber.

12. The shoe sole according to claim 11, wherein the rubber composition comprises at most 20 phr of the second diene elastomer.

13. The shoe sole according to claim 11, wherein the second diene elastomer is selected from the group consisting of polybutadienes (BRs), synthetic polyisoprenes (IRs), natural rubber (NR), butadiene copolymers, isoprene copolymers and blends of these elastomers.

14. The shoe sole according to claim 13, wherein the second diene elastomer is selected from the group consisting of natural rubber (NR), polybutadienes, and blends of these elastomers.

15. The shoe sole according to claim 1, wherein the reinforcing filler comprises carbon black, silica, or a mixture of carbon black and silica.

16. The shoe sole according to claim 15, wherein the content of reinforcing filler is between 10 and 40 phr.

* * * * *